United States Patent

Sadowsky

[15] 3,668,633

[45] June 6, 1972

[54] ORIENTATION AND LINEAR SCAN DEVICE FOR USE IN AN APPARATUS FOR INDIVIDUAL RECOGNITION

[72] Inventor: Charles Sadowsky, Great Neck, N.Y.

[73] Assignee: Dactylog Company, New York, N.Y.

[22] Filed: Jan. 29, 1970

[21] Appl. No.: 6,662

Related U.S. Application Data

[63] Continuation-in-part of Ser. No. 855,955, Sept. 8, 1969.

[52] U.S. Cl. ....................................340/146.3 E, 340/149 A

[51] Int. Cl. ..........................................................G06k 9/00

[58] Field of Search .....................340/146.3, 149 A; 350/71; 84/319; 197/101; 132/73

[56] References Cited

UNITED STATES PATENTS

| | | | |
|---|---|---|---|
| 3,516,059 | 6/1970 | Hindman et al. | 340/149 A |
| 3,292,149 | 12/1966 | Bourne | 340/146.3 |
| 2,393,371 | 1/1946 | Harris | 132/73 |
| 2,580,739 | 1/1952 | Delno et al. | 132/73 |
| 3,167,612 | 1/1965 | Strickholm | 235/61.115 |
| 3,581,282 | 5/1971 | Altman | 340/146.3 E |
| 3,576,538 | 4/1971 | Miller | 340/146.3 E |

*Primary Examiner*—Daryl W. Cook
*Assistant Examiner*—William W. Cochran
*Attorney*—Curtis, Morris & Safford

[57] ABSTRACT

An apparatus for positively orienting a designated skin area of an individual to be identified or whose identity is to be verified with respect to a linear light scan device adapted to project a linear light scan along the designated skin area of the individual. Because each individual's skin configuration is unique, the light scan incident on the designated skin area produces a shadow effect which is unique. The incident light is detected by a photocell and transduced into electrical signals representative of, and unique to, a particular individual. These signals may then be compared with a known set of signals to identify the individual or verify the individual's identity. The designated skin area, for example the underside of a selected finger, is positively oriented with respect to the linear light scan device by means of a hand support and floating finger guide which automatically adjusts to an individual's finger size and, as it adjusts, moves the linear light scan device so that the linear light scan is always oriented along substantially the same linear scan path of a particular individual's finger. Thus, when an individual repeatedly places the designated finger in the apparatus, the linear scan is taken along the same portion of the individual's designated skin area.

15 Claims, 6 Drawing Figures

PATENTED JUN 6 1972

3,668,633

SHEET 1 OF 3

INVENTOR.
Charles Sadowsky
BY
Curtis Morris & Safford
ATTORNEYS

ORIENTATION AND LINEAR SCAN DEVICE FOR USE IN AN APPARATUS FOR INDIVIDUAL RECOGNITION

This application is a continuation-in-part of copending application Ser. No. 855,955, filed Sept. 8, 1969.

This invention relates to an apparatus to positively orient a designated skin area of an individual, for example the underside of a selected finger of an individual's hand, with respect to a linear light scan so that the same linear scan path of the designated skin area of the individual may be repeatedly positively oriented to enable identification of the individual through transducing of electrical signals representative of the individual's unique skin configuration.

In my prior copending application, a method and apparatus for individual recognition is disclosed which utilizes a linear light scan directed at an angle to a designated skin area of an individual in order to cause a shadow effect of light and dark areas. This results because light incident at an angle on the ridges and valleys of the individual's skin configuration produces a shadow effect which is reflected back to a photoelectric detection cell and transduced into appropriate electrical signals which are then compared with a known set of electrical signals known to correspond to a particular individual. In this manner, positive individual identity verification can be made as the ridges and valleys of an individual's skin are unique to each individual and the shadow effect and, hence, the electrical representations are also unique. In my prior application, a single light source disposed at an angle with respect to the skin area to be scanned is mounted on a carriage which is mechanically moved along a linear scan path and the designated skin area, for example the underside of a particular finger of an individual, is utilized as the designated skin area for positive individual identification. The finger is oriented with respect to the linear scan path by means of a flat plate upon which the hand is supported and a pivotal finger clamp which holds one side of an individual's finger against a fixed finger support plate. The pivoting action of the clamp allows limited pivoting motion of a clamp plate on the other side of the individual's finger in order to accommodate variations in finger sizes from individual to individual.

The apparatus of the present invention is adapted to be utilized in an individual recognition apparatus as described in my prior copending application and is designed to provide a positive orientation for an individual's hand and a designated skin area of a selected finger with respect to a linear light scan. In addition, the present invention provides a more sophisticated means to provide a linear light scan without requiring the necessity of a mechanical carriage assembly to reciprocate along a linear path.

It is an object of the present invention to provide an apparatus to positively orient a designated skin area of an individual with respect to a fixed linear path.

It is a further object of the present invention to provide an apparatus to orient a selected finger of an individual's hand with respect to a fixed linear light scan path so that repeated placement of the same finger by the same individual in the apparatus of the present invention will result in the same designated skin area being oriented along the fixed linear light scan path.

A still further object of the present invention is to provide an apparatus for use in an individual recognition device wherein means are provided to induce a linear light scan along a linear path without necessitating reciprocating movement of a light along the linear light scan path.

In accordance with a preferred embodiment of the present invention, a surface plate is provided which acts as a stable support for the palm of the hand of an individual and the surface plate is provided with vertically extending finger separation plates to spread the fingers to the hand to provide a wide lateral bearing surface for the hand on the surface plate. Spreading of the fingers while the palm is pressed on the plate tends to minimize rotation of an individual's hand while it is oriented to the linear light scan device. The selected finger of the individual to be scanned, for example the third finger of the individual's hand, is placed over a slot in the support plate and is held down by a floating spring-biased finger. Extending upwards through the slot are a pair of opposed spring-biased finger guide plates which are adapted to press against each side of the designated finger and the finger guide plates are mounted on a floating carriage assembly beneath the support plate. Mounted within the floating carriage assembly is a block which houses a number of linearally aligned glass fibers of the type used in fiber optics which provide the light source for a linear light scan along the designated skin area exposed through the slot in the support plate. Adjacent the fiber optic array adapted to emit a sequential series of light flashes is a similar array of fiber optic elements which are adapted to receive the light reflected from the designated skin area of the individual produced by the first array of fiber optic elements. Both sets of fiber optic elements are in a housing which moves with the floating carriage and insures that even if the individual's finger moves relative to the support plate, the linear light scan will move with the finger so that the same linear scan path can be obtained repeatedly when the same individual places his hand on the device to be scanned.

These and other objects and advantages of the invention will be more readily apparent from consideration of the following description and accompanying drawings.

Figure 1:
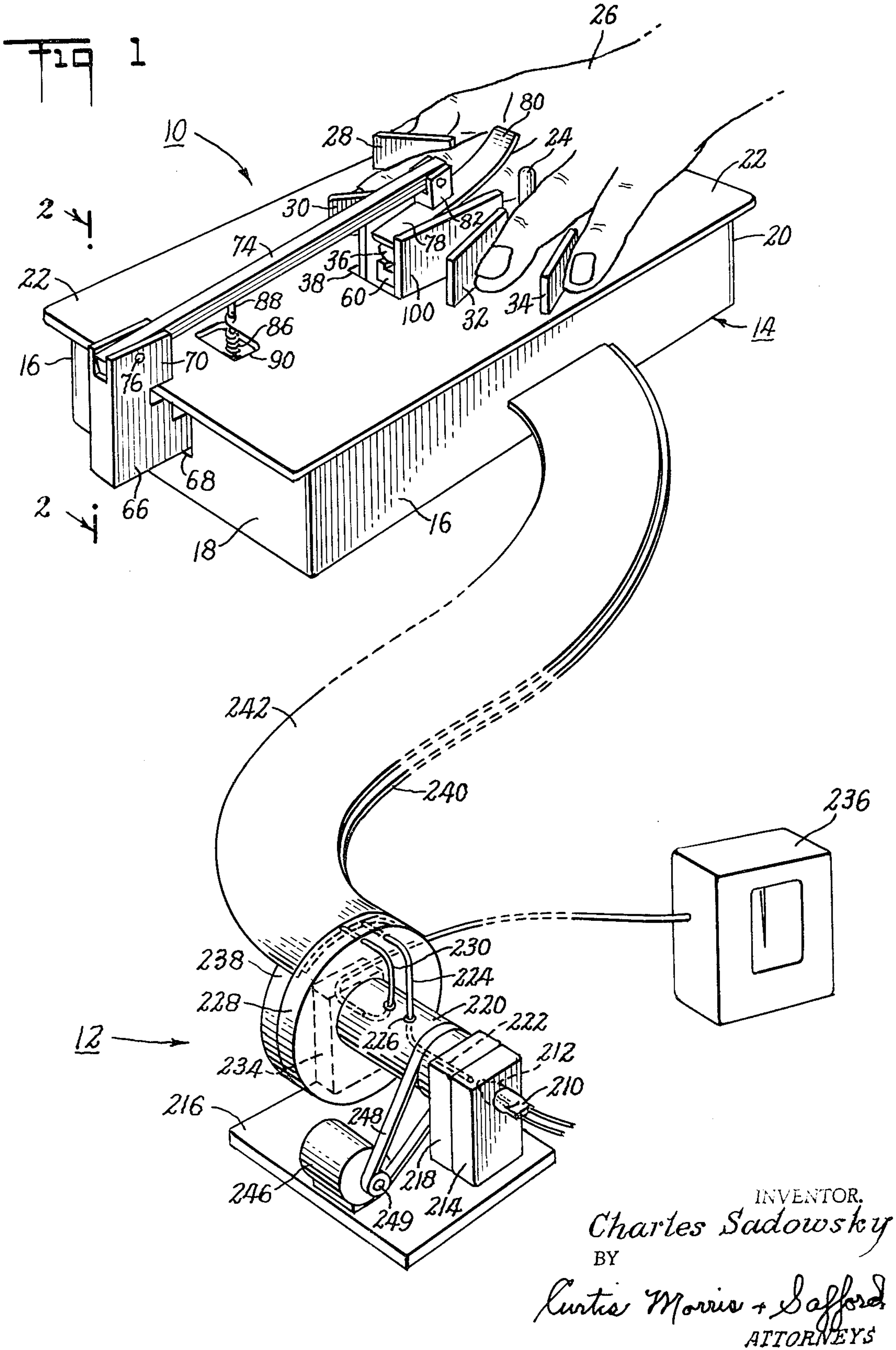
FIG. 1 is a perspective view showing a diagrammatic representation of the apparatus of the present invention.

With reference now to the drawings and particularly FIG. 1, there is shown a positive finger orientation apparatus 10 and an associated linear light scan and detecting unit 12, which unit will be described more fully hereinbelow. The orientation unit 10 includes a base support unit comprising a rectangular support 14 having upstanding side walls 16, rear end wall 18 and a front end wall 20 to support a horizontally disposed hand support plate 22. Fixed to support plate 22 and upstanding therefrom, is a hand stop member, which may be an upstanding dowel 24, adapted to abut against the joint between the third and fourth finger of an individual's hand 26 placed on the identification unit. Four upstanding finger separation plates 28, 30, 32 and 34, respectively, are also provided and are spaced so that when the individual's hand 26 is placed on the identification unit 10, the fingers of the hand are spread by the upstanding plates 28–34 to provide a wide base lateral support which precludes relative rotation of the individual's hand so that the designated area for the linear scan, for example the underside of the third finger 36, is positively oriented and relative rotation of the designated finger 36 is precluded.

Support plate 22 is provided with a rectangularly shaped central cutout 38 positioned on plate 22 with respect to dowel 24 and the finger separation plates 28–34 so that the underside of the selected middle finger 36 is oriented over cutout 38.

Figure 2:
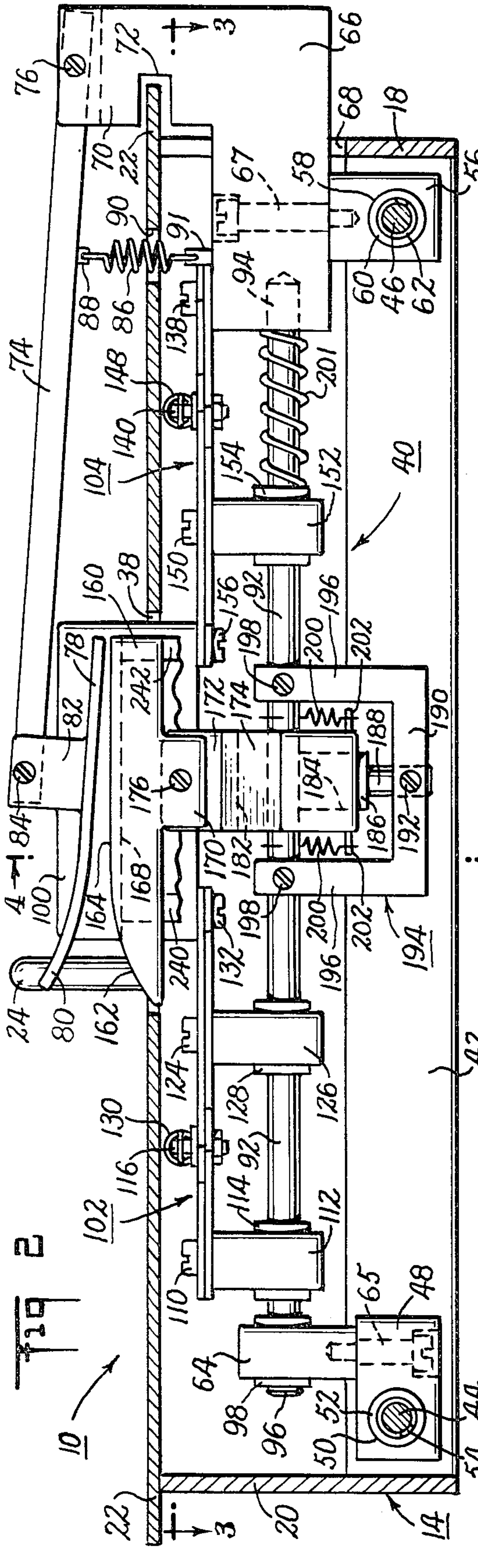
FIG. 2 is a vertical, sectional view taken on line 2—2 of FIG. 1.
Figure 3:
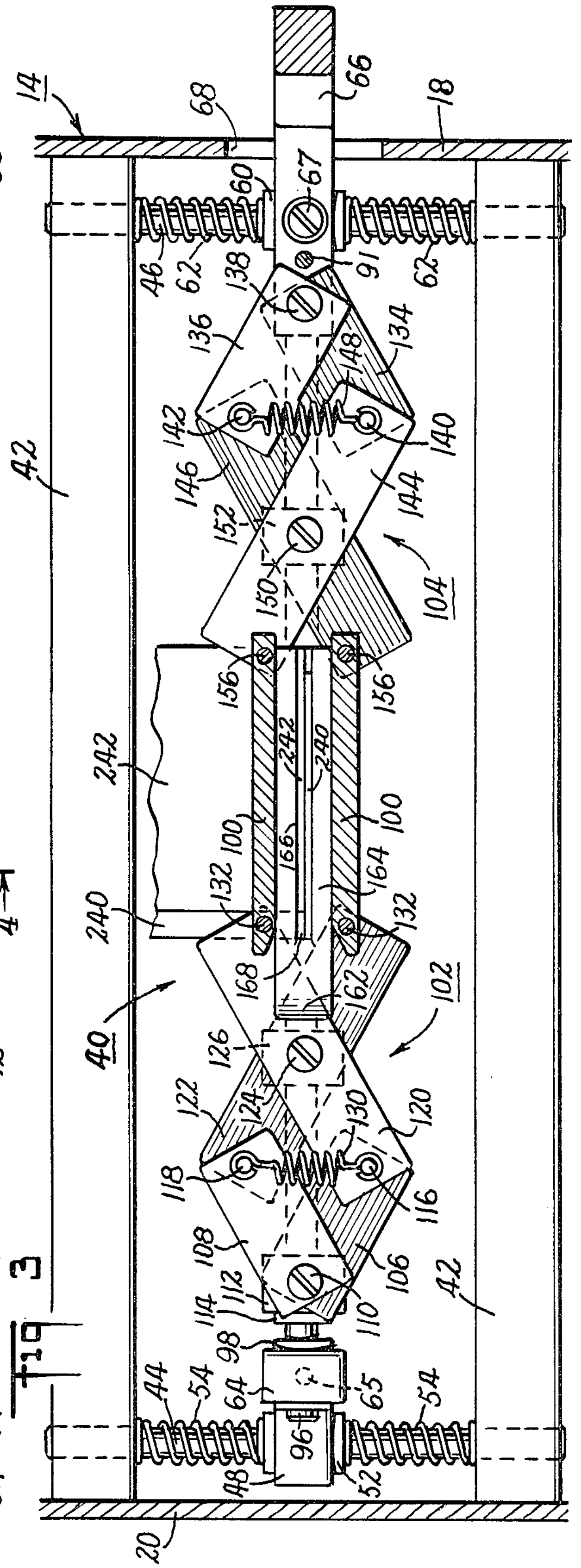
FIG. 3 is a horizontal, sectional view taken on line 3—3 of FIG. 2.

While rotational movement of the selected finger 36 is precluded because the hand is pressed down on support plate 22 and the spread fingers of the hand provide lateral bearing surface, limited movement of the selected finger 36 from side to side is still possible and, thus, a floating carriage assembly 40 (see FIGS. 2 and 3 as well) is provided to accommodate the side-to-side relative movement of the selected finger with respect to the linear light scan and sensing unit carried by the carriage assembly 40, as will be explained more fully below.

Floating carriage assembly 40 comprises a pair of spaced side rail members 42 which are fixed within housing unit 14 and which are interconnected at each end by cylindrical cross-brace rods 44 and 46, respectively. A support block 48 provided with a transverse bore 50 in which is mounted a cylindrical bushing 52 is slidably disposed on cross-brace rod 44 with the rod 44 positioned to extend through bushing 52. Disposed around rod 44 and on each side of block 48 are a pair of compression springs 54 which tend to orient block 48 generally midway between side rails 42. Thus, block 48 may slide laterally along rod 44 against the action of either of the springs 54 but will normally be returned to an at-rest position midway between side rails 42 whenever the force tending to displace block 48 laterally along rod 44 is removed.

In similar fashion, another support block 56, including a bore 58 in which is fixed a bushing 60 to slidably accommodate cross-brace rod 46, is provided to slide along rod 46 with opposed compression springs 62 tending to orient block 56 midway between side rails 42. Block 56 may also move along rod 46 and is returned to its at-rest position when any force tending to displace block 56 along rod 46 is removed.

An upstanding block 64 is pivotally mounted by a shoulder screw 65 to block 48 and an upstanding L-shaped block 66 is similarly pivotally mounted to block 56 by a shoulder screw 67. Block 66 extends through rear end wall panel 18 through a slot 68 therein with the upstanding leg 70 extending above the surface of support plate 22. A notch 72 is provided in leg 70 to give clearance between the leg 70 and the overhang of surface plate 22. One end of an arm 74 is pivotally mounted on the upstanding leg 70 of block 66, as at 76, and the other end of arm 74 has pivotally mounted thereon a finger depressant plate 78. Plate 78 is provided with an upwardly curved segment 80 at its forward end and includes a bifurcated bracket member 82 on its top surface which is pivotally connected to arm 74 at 84. A tension spring 86 has one end fixed to a lug 88 on the underside of arm 74 and extends through a cutout 90 in support plate 22 and has its other end fixed to a lug 91 mounted on the horizontally disposed leg of block 66. Thus, tension spring 86 tends to pull finger depressant plate 78 downwardly to exert downward pressure on a finger 36 of an individual's hand, when the individual's finger is inserted under plate 78. The tension of spring 86 is sufficiently high to exert a force on the finger 36 to keep it flat and in contact with a lower support block but not high enough to resist insertion of a finger under the upwardly curved portion 80 of plate 78.

A longitudinally disposed central support shaft 92 has one end 94 fixed in support block 66 and its other end 96 slidably disposed through a bushing 98 mounted in upstanding support block 64.

Beside the finger depressant plate 78, the finger orientation and positioning unit includes spaced lateral side plates 100 which extend upwardly from beneath the surface of support plate 22 through slot 38. Side support plates 100 are laterally movable toward and away from each other and are spring biased toward each other so that the plates are spread apart against the spring force when the finger 36 is inserted therebetween. Side support plates 100 are pivotally supported at each end on a pair of spring-biased, lazy-tong units 102 and 104, respectively. Lazy-tong unit 102 includes a first pair of leg members 106 and 108 which are pivotally joined, as at 110, to a slide block 112 provided with a through bushing 114 through which central support shaft 92 extends. Pivotally connected to the other ends of leg members 106 and 108, for example by pivot connections 116 and 118, respectively, are a second pair of leg members 120 and 122. Legs 120 and 122 cross each other and are pivotally interconnected at their approximate midpoint, for example by pivotal connection 124, and are joined to a slide block 126 provided with a through bushing 128 through which central support shaft 92 extends. The pivotal connections 116 and 118 are interconnected by a tension spring 130 which tends to normally urge the pivotal connections 116 and 118 toward each other. The forward end of plates 100 are pivotally connected, as at 132, to the free ends of leg members 120 and 122 of lazy-tong unit 102 and, because of spring 130, the forward end of plates 100 are also normally urged toward each other.

In like manner, lazy-tong unit 104 includes first leg members 134 and 136, respectively, pivotally mounted, as at 138, to the top of block 66 and pivotally connected, for example by pivot connections 140 and 142, respectively, to second leg members 144 and 146. Spring 148 interconnects the two pivotal connections 140 and 142 and normally urges them toward each other. Legs 144 and 146 are pivotally interconnected at their approximate midpoints, for example by pivotal connection 150, and are fixed to a slide block 152 provided with a through bushing 154 through which central support shaft 92 extends. The free ends of legs 144 and 146 are pivotally fixed, as at 156, to the rear end of lateral side support plates 100.

The bottom surface of finger 36, when it is inserted between side plates 100 and beneath finger depressant plate 78 rests upon an upwardly biased block member 160. Block 160 is a housing block for the linear array of fiber optic light emitting and receiving arrays, as will be explained more fully hereinbelow. At its forward end, block 160 includes an inclined ramp portion 162 directly beneath the upwardly curved segment 80 of finger depressant plate 78 and the opening afforded by segment 80 and ramp 162 provide a wide opening for the end of the selected finger 36 to be inserted therein. As the finger is inserted further therein, the spring tension on the side plates 100 and on the plate 78, as well as spring tension on the support block 160, is overcome until the finger is seated to its full extent and snugly retained.

Figures 4, 5, 6:
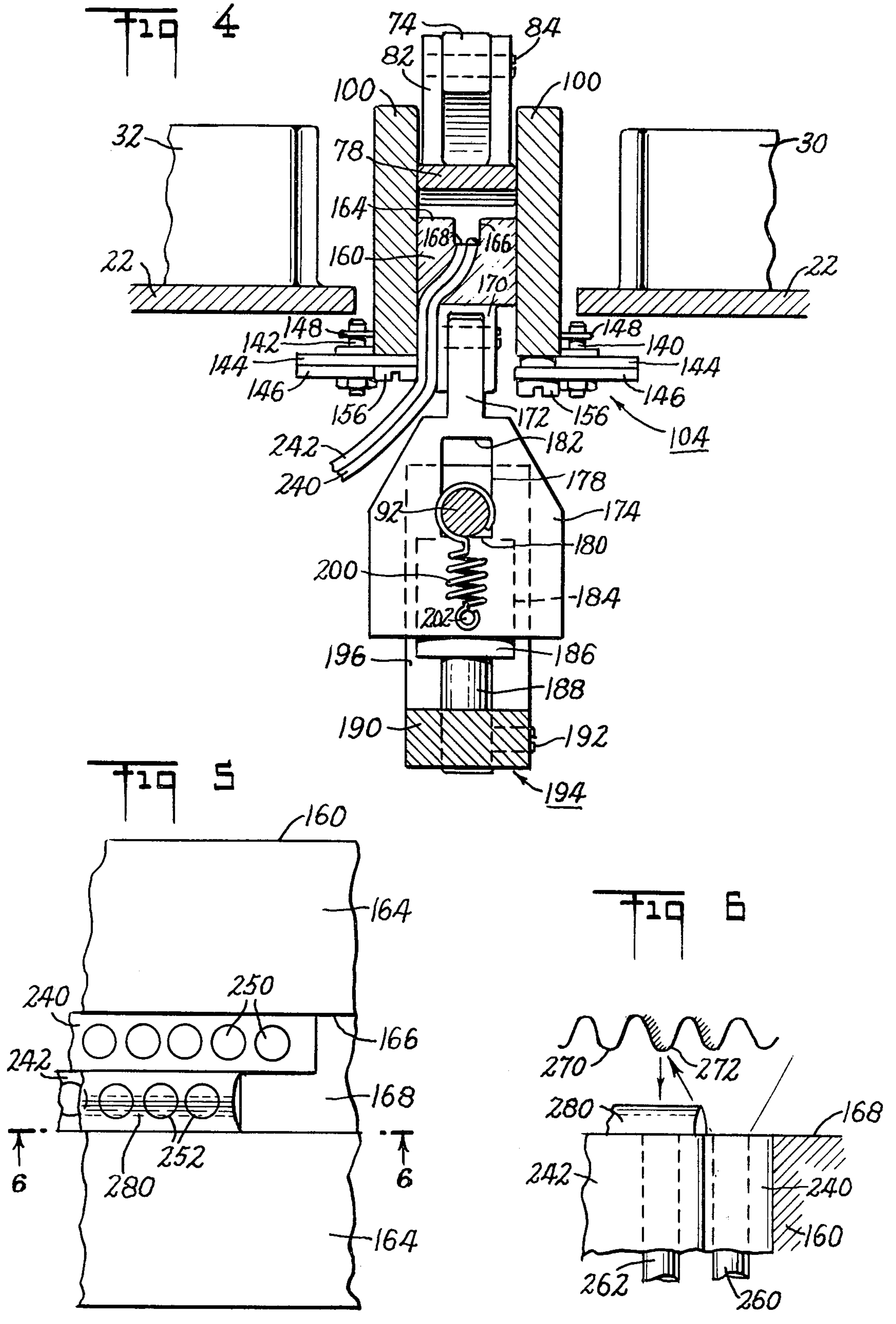
FIG. 4 is a vertical, sectional view taken on line 4—4 of FIG. 2.
FIG. 5 is a plan view, on an enlarged scale, of a portion of the fiber optic housing block.
FIG. 6 is a vertical, sectional view taken on line 6—6 of FIG. 5 showing the relative position of the fiber optic housing block with respect to a designated skin area which is to be scanned.

Block 160, as seen in FIG. 4, is provided with an upper finger bearing surface 164 and a central cutout portion 166 which has a lower surface 168 to accommodate the array of fiber optic elements. Thus, as the finger rests on support surface 164, the central portion of the finger, which is the designated area to be scanned, is positioned over the central cutout 166 and is exposed to the fiber optic array without being in direct contact with the array.

Spaced inwardly from the side faces of block 160, and depending from the lower surface of block 160, is a bifurcated bracket 170 which is pivotally connected, as at 176, to an extending ear 172 of a movable block member 174 to accommodate for pitching movement as finger 36 is inserted in the unit. An access slot 178 is provided through block 174 to receive central support shaft 92 therethrough and, as seen in FIG. 4, block 174 is vertically movable with respect to central shaft 92 therethrough and, as seen in FIG. 4, block 174 is vertically movable with respect to central shaft 92 within the limits of the bottom 180 and the top 182 of access slot 178.

The lower portion of block 174 is provided with a bore 184 to receive a bushing 186 within which is slidably disposed a vertical guide shaft 188 rigidly secured at its lower end by a set-screw 192 to the bight portion 190 of a U-shaped bracket member 194. The leg portions 196 of bracket 194 are provided with a through bore to accommodate central support shaft 92 and bracket 194 is rigidly fixed to shaft 92 by set screws 198.

A pair of tension springs 200 each have one end clipped over shaft 92 and the other end fixed to a lug 202 extending from block 174. Thus, block 174 is free to move vertically with respect to shaft 92 within the limits defined by the ends 180 and 182 of access slot 178. Tension springs 200 insure that block 160 remains normally in an elevated at rest position. However, when finger 36 is inserted between block 160 and finger depressant plate 78, the tension of springs 200 are overcome and block 160 is forced downwardly to accommodate finger 36. Since block 160 is fixed to block 174, block 174 is moved vertically and slides on vertical guide shaft 188 to a position intermediate the ends 180 and 182 of access slot 178. The extent of movement of block 160 is dependent upon the thickness of the individual finger inserted within the unit.

Thus, it is seen that when a finger 36, preferably the middle finger of an individual's hand, is inserted between the plate 78 and block 160 and the remaining fingers of the hand are spread because of their placement adjacent the upstanding guide members 28–34, and the hand 26 is pressed against support plate 22, rotational movement of the selected finger 36 is effectively precluded. Lateral movement of the finger is still possible and, thus, the floating support assembly 40 is provided in order to insure that the same linear scan portion on the underside of the selected finger is placed above the slot 166 in block 160. The side plates, through their connection to spring-biased, lazy-tong units 102 and 104, will spread apart as the finger is inserted therebetween. Also, since the support plates 100 are interconnected by the lazy-tong units, the lateral movement of each plate 100 at each end will be the same as the movement of the other plate at the same end. Thus, the central portion of the underside of the finger will tend to be oriented directly over the slot 166 and the designated line for the linear scan will be a line midway between the side plates 100.

Once the finger is between the plates 100, finger depressant plate 78 presses downwardly on the top of the finger. Block 160 being spring biased upwardly, because of the mounting of block 174 and springs 200, exerts an opposite pressure on the finger to produce a compressive force on the finger tending to keep the finger flat against the top surface 164 of block 160. Now, lateral displacement of the finger 36, which is relatively snugly held on block 160, will result in block 160 shifting along with the laterally moving finger. This is so, because block 160, as well as the lazy-tong units 102 and 104, are all mounted on central support shaft 92 mounted at each end in blocks 64 and 66. These blocks are in turn pivotally secured to blocks 46 and 56, respectively, which blocks can slide along guide rods 44 and 46. Thus, any attempt to pivot the finger with respect to support surface 22 will cause a similar pivoting movement to be imparted to the floating support assembly 40 thus maintaining the slot 166 fixed in the same relative position to the intended linear scan path along the centerline of the underside of finger 36. Since central support shaft 92 is slidably disposed within bushing 98 in upstanding support block 64, shaft 92, as it pivots about its pivotal mounting in block 66, i.e., shoulder screw 67, will slide relative to bushing 98. A spring 201 disposed about shaft 92 between block 66 and sliding block 152 tends to urge tong unit 104 to the left, as viewed in FIG. 2, thus exerting additional force on tong unit 104 to draw plates 100 closer together. Thus, plates 100, at their forward end, exert a greater pressure on finger 36 when it is placed between plates 100. This is done so that plates 100 will open first between pivots 132 as the finger is inserted therein and, after the finger is partially inserted, the plates 100 open between pivots 156.

As noted above and described more fully in my prior copending application, identification and/or verification of an individual's identity may be made by transducing the characteristics of the ridges and depressions along a designated skin area of an individual, for example the underside of a selected finger, into electrical representations which may then be compared with corresponding electrical representations known to belong to the individual whose identity is to be verified. As discussed in my copending prior application, if a light is directed at an angle along a linear scan path of a designated skin area of an individual, the light, as it is incident on the ridges and depressions of the skin, will produce a shadow effect which may be detected by a photoelectric cell. The variations in the light produced by the ridges and depressions, which are uniquely characteristic to a particular individual, may be converted by the photoelectric cell into appropriate electrical signals which may be correlated and matched by a computer to previously stored electrical representations in the computer memory bank in order to verify the identity of the individual whose designated skin area is being scanned. In my prior copending application, one light source and one photoelectric cell fixed at the proper relative angle is caused to mechanically traverse the designated skin area in order to obtain the linear scan to produce the appropriate electrical signals necessary for the verification of the individual's identity.

In the present invention, no mechanical traversing means are utilized but, instead, a linear array of a plurality of fiber optic elements are disposed below the designated skin area and the light source is sequentially induced in the linear array of fiber optic elements in order to produce a linear light scan. In like manner, a linear array of fiber optic elements are disposed adjacent the light emitting fiber optic elements in order to receive the incident reflection from the light emitting array thereby to sense the variations in the light due to the shadow effect which may then be converted into appropriate electrical representations in the same manner as disclosed in my copending application.

With reference to FIGS. 1, 4, 5 and 6, it is seen that the light emitting and receiving unit 12 includes a light source 210 fixed to emit a beam of light through a bore 212 in an upstanding support block 214 fixed to a platform support 216. Adjacent to block 214 is a similarly constructed block 218 upon which is rotatably mounted a cylindrical drum 220. Block 218 has a bore 222 therein in axial alignment with the bore 212 and the light beam so that light is transmitted through block 218 to a fiber optic element 224 which has one end disposed in axial alignment with light source 210. Fiber optic element 224 is then directed out of drum 220 through an opening 226 and disposed so that its other end is fixed near the periphery of a disc 228 rigidly fixed to drum 220. Another fiber optic element 230 has one end rigidly fixed in disc 228 radially outwardly from fiber optic element 224 and this element 230 extends into drum 220 to have a portion in axial alignment with the axis of rotation of drum 220. This end of element 230 passes out of drum 220 through an access bore in a support block 234 and thence to a photoelectric detection unit 236 which is adapted to transduce the sensed photoelectric impulses into appropriate electric signals which are then compared in the same manner as described in my prior copending application.

It is noted that the fiber optic elements 224 and 230 pass through a cylindrical bushing which mounts the rotating drum 220 so that when drum 220 rotates no twisting stress is imparted to fiber optic elements 224 and 230. A fixed disc 238 is mounted to support block 234 and includes, adjacent its periphery along an arc of disc 238, two sets or arrays of closely spaced fiber optic elements. The first array 240, comprising a plurality of closely spaced fiber optic elements, are mounted in disc 238 so that an optically receptive end (not shown) is in registry with the optically receptive end of light emitting fiber optic element 224 in rotating disc 238. The second array 242, also comprising a plurality of closely spaced individual fiber optic elements mounted in disc 238, are disposed to have an optically receptive end in registry with the optically receptive end of fiber optic element 230 in rotating disc 228. Thus, light from light source 210 is incident upon one end of fiber optic element 224 and is transmitted through the fiber optic element 224 to the optically receptive other end.

As drum 220 is rotated, for example by a motor 246 and belt 248 operably connecting the drive shaft 249 of the motor with drum 220, the light is transmitted serially to the fiber optic elements of the array 240. The fiber optic array 240 is initially in an arcuate configuration and is flattened as the array extends outwardly from disc 238 and is linearally disposed with the optic receptive ends 250 (see FIG. 5) mounted flush with surface 168 in block 160 within the cutout portion 166. In like manner, the fiber optic array 242 is also linearally aligned in block 160 to have the optically receptive ends 252 exposed in cutout 166 of block 160.

Array 240 is the light emitting array and array 242 is the light receiving array and as seen in FIG. 5, array 242 is offset with respect to array 240 for a purpose as will be described more fully hereinbelow. In like manner, light reflected back to the optically receptive ends 252 of array 242 will be serially incident on each of the adjacent exposed ends 252 and will be transmitted back to the optically receptive ends of array 252 in disc 238. As drum 220 rotates, fiber optic element 230 rotates so as to be serially in registry with the exposed ends of the fiber optic array 242 and will pick up light transmitted by array 242 and transmit the light in turn to photoelectric sensing unit 236.

Because the light must be incident at an angle to the ridges and depressions of the skin configuration in order to provide the light and dark shadow effect which is then transduced into suitable electrical signals, a particular light emitting fiber optic element 260 (see FIG. 6) is coupled to a particular reflected light receiving fiber optic element 262 which is displaced from the particular mating fiber optic emitting element. Thus, as seen in FIG. 6, light emitted from fiber optic 260 is dispersed in a conical pattern from the emitting source and it is the rays of the light incident at an angle to the underside 270 of the finger which is being scanned, indicated by the arrow, which are utilized. Thus, a ridge of the skin configuration 272 will be light on one side and dark on the other side away from the light and this pattern will be reflected back downwardly, as indicated by the arrow, to the light receiving fiber optic element 262.

Preferably, a lens 280 is provided over the light receiving fiber optic array 242 to focus the light reflected back from the designated skin configuration 270. Thus, the light emitting fiber optic elements are paired with an offset light receiving fiber optic element. As drum 220 rotates and light emitting fiber optic element 224 moves into registry with the first of the fiber optic elements 260 in array 240, light will be transmitted upwardly to be incident on the designated skin area of a finger of an individual whose hand is on the unit 10. This light will be reflected back to the first light receiving fiber optic element 262 which will transmit reflected light back to the other end of fiber optic array 242 where this light will be incident on fiber optic element 230 and thus be transmitted to photoelectric cell 236. As the drum continues to rotate the second and third and so on will serially operate in the same manner. A lens may also be used over the array 240 to deflect more of the emitted light at an angle to be incident on the designated skin area if so desired.

It is also seen that utilizing the technique of fiber optics coupled with the rotating drum which serially brings individual fiber optic elements into operation, a linear light scan is employed to scan a linear path along the designated skin area exposed thereto. While the scan is made in discrete increments, it is sensibly a continuous scan because it is sampled at a very high rate. The light reflected back as a result of the linear scan is also received by a fiber optic array and transmitted to photoelectric unit where the light signals are transduced into suitable electrical signals which can then be used to verify or identify an individual by comparing the transduced signals with a stored set of signals known to belong to the individual being identified.

What is claimed is:

1. A device for positively orienting a designated skin area of an individual comprising a preselected linear segment of said individual's skin in an apparatus for establishing the identity of an individual including means for detecting distinguishing skin characteristics along said preselected linear segment, means for transducing said distinguishing characteristics into electrical signals representative of said distinguishing characteristics and means for comparing said transduced electrical signals with a set of stored electrical signals known to be representative of the same preselected linear segment of said individual's skin whose identity is to be verified, the improvement comprising, means to preclude relative rotation of said linear segment of said individual's skin about an axis coincident with the longitudinal axis of said linear segment, means to orient said preselected linear segment of said individual's skin repeatedly to the same fixed relationship with respect to said means for detecting distinguishing skin characteristics including floating adjustable support means to support that portion of the individual's anatomy which includes said preselected linear segment which adjusts to accommodate variations in size for that particular portion of anatomy from individual to individual and including floating means to compensate for lateral and vertical displacement of said preselected linear segment thereby to maintain the fixed orientation between said linear segment and said means for detecting distinguishing skin characteristics.

2. A device as defined in claim 1 wherein said preselected linear segment of said individual's skin is a linear segment along the underside of a selected finger of an individual's hand and said means to preclude relative rotation of said preselected linear segment comprises a flat planar surface upon which an individual may place his hand palm down, said planar surface including a plurality of upstanding finger guide and positioning members spaced so as to spread the fingers of an individual's hand when the hand is positioned on said device whereby said planar surface and said finger guide and positioning members cooperate with the palm of said individual's hand when said palm is pressed against said planar surface to provide a wide lateral bearing surface for the hand to preclude relative rotation of said preselected linear segment of said selected finger.

3. A device as defined in claim 2 wherein said planar surface includes a cutout portion located below said selected finger when said individual's hand is operatively positioned on said device and wherein said means to orient said preselected linear segment of said selected finger comprises a pair of spaced spring-biased side plate members extending upwardly within said cutout and adapted to yieldingly grasp said selected finger, said side plates being mounted on a floating sub-assembly adapted to move vertically and laterally independently of said planar surface, and a portion of said means for detecting distinguishing skin characteristics being mounted within said sub-assembly thereby to move correspondingly with said side plates when said side plates are laterally displaced by said selected finger.

4. A device as defined in claim 3 wherein said side plates are pivotally mounted at each end to said sub-assembly with the pivotal mounting for one end of said plates being independent of the pivotal mounting of the other end and wherein each end of said plates is pivotally mounted to a spring biased lazy-tong assembly carried by said sub-assembly whereby each end of said plates may move independently of the other end with movement of each said plate resulting in a correspondingly opposite movement in the other of said plates.

5. A device as defined in claim 4 wherein said floating sub-assembly includes a block member independently mounted in said sub-assembly between said side plate members and spring biased upwardly, said block member including an upper surface thereon adapted to contact and support the underside of said selected finger and further including said means for detecting distinguishing skin characteristics positioned below said upper surface and adapted to scan said selected finger along said selected linear segment.

6. A device as defined in claim 3 wherein said means for detecting distinguishing skin characteristics comprises a plurality of fiber optic elements disposed in a first linear array with an optically receptive end of each element positioned to serially emit a light beam incident along said linear segment, a plurality of fiber optic elements disposed in a second linear array adjacent said first array with an optically receptive end of each element adapted to receive light reflected from said linear segment and emitted by said first array, said first and second linear fiber optic arrays being mounted within said sub-assembly, means to transmit light from a light source serially to the optically receptive other end of each said fiber optic element in said first array, and means at the optically receptive other end of each said fiber optic element in said second array to receive light transmitted through said second fiber optic array.

7. A device as defined in claim 6 wherein said means to transmit and receive light comprises a rotatably mounted cylindrical drum, a light source disposed to emit a beam of light along the longitudinal axis of said drum, a first fiber optic element in said drum having one end axially aligned along said axis with an optically receptive end exposed to said beam of light, a first disc having a diameter greater than the diameter of said drum and fixed to rotate with said drum, the other end of said first fiber optic element being disposed through said disc with its optically receptive end being exposed on one surface of said disc, a second fiber optic element having one end axially aligned along said axis with an optically receptive end exposed to a light detecting means, the other end of said second fiber optic element being disposed through said disc with its optically receptive end being exposed on said one surface radially displaced from said optically receptive end of said first fiber optic element, a second disc fixed to a support disposed adjacent said one surface of said first disc, the optically receptive ends of said fiber optic elements of said first array being arcuately disposed through said second disc and positioned to be serially in registry with the optically receptive end of said first fiber optic element in said first disc when said drum and first disc are rotated, the optically receptive ends of said fiber optic elements in said second array being arcuately disposed through said second disc and positioned to be serially in registry with the optically receptive end of said second fiber optic element in said first disc when said drum and first disc are rotated, and means to rotate said drum and first disc whereby light is transmitted from said light source through said first fiber optic element and serially transmitted through the plurality of fiber optic elements in said first array to be incident along said linear segment and is reflected back to said second array of fiber optic elements to said second fiber optic element to said light detecting means.

8. A device as defined in claim 7 wherein said light detecting means is a photoelectric cell including means to transduce the sensed light pattern into electrical signals representative of the detected light pattern.

9. A device as defined in claim 6 including a focusing lens disposed over said optically receptive ends of said second fiber optic array to focus light reflected back from said selected finger.

10. A device for orienting a selected linear segment on the underside of a selected finger of an individual's hand in an apparatus for establishing the identity of an individual by detecting distinguishing characteristics of the skin along said linear segment and transducing said distinguishing characteristics into electrical signals representative of said characteristics and comparing said transduced signals with a set of electrical signals known to be representative of the distinguishing characteristics of a known individual along the same linear segment comprising, a support plate to position the hand of an individual palm downwards, upstanding finger guide and positioning members to orient the hand on said support plate and spread the fingers of the hand to provide a wide lateral bearing surface between the hand and said support plate to preclude relative rotation of said selected finger about an axis coincident with said linear segment, a cutout in said support plate below the selected finger when said hand is in position on said plate, and an independently mounted floating finger orienting assembly mounted below said support plate having finger gripping and retaining members extending through said cutout to snugly grasp said selected finger and positively orient said selected finger and the selected linear segment of said finger to a fixed relationship with respect to a linearly disposed scan path in said floating assembly.

11. A device as defined in claim 10 wherein said floating finger orienting assembly includes fixed spaced guide rods, each said guide rod having a support block slidably disposed thereon, a mounting block pivotally mounted on each said support block, a central support shaft extending between each said mounting block, one end of said shaft being fixed in one of said mounting blocks and slidably retained in the other of said mounting blocks, spring-biased spaced side plate members extending through said cutout adapted to snugly contact each side of said selected finger, said side plate members being mounted on said shaft whereby lateral movement of said selected finger will laterally displace said side plates and said shaft along said guide rods.

12. A device as defined in claim 11 wherein said side plates are supported at each end by a pair of spring biased lazy-tong expansion units, one of said lazy-tong units being independently slidably mounted on said shaft and the other of said lazy-tong units having one end pivotally fixed to said one of said mounting blocks and having an intermediate support slidably disposed on said shaft, each said lazy-tong units being spring biased to normally urge said side plates toward each other, whereby as said selected finger is inserted between said side plates said side plates are moved apart to accommodate said finger against the spring tension of said lazy-tong units and each end of said side plates can pivot open independently of the other end whereby said side plates adjust so that said linear segment is disposed centrally of said side plates.

13. A device as defined in claim 12 including a spring-biased finger support block carried by said support shaft, said block being pivotally mounted on a support member so as to pivot along an axis transverse to said selected finger, said support member being vertically movable with respect to said support shaft and spring biased thereon so that said finger support block is normally urged upwardly against the underside of said selected finger and said linearly disposed scan path being disposed within said finger support block in a plane displaced vertically below said selected finger.

14. A device as defined in claim 13 including a spring-biased finger depressant plate carried by said floating assembly, said plate being positioned above said finger support block and biased downwardly to press on the top of said selected finger to retain said finger against said support block whereby said selected finger is snugly retained on said support block by the opposed compressive forces imposed by said side plates and said finger depressant plate and finger support block and lateral movement of said selected finger is transmitted to said assembly which moves correspondingly thereby to maintain a fixed relationship between said linear segment and said linear scan path.

15. A device as defined in claim 13 wherein said selected linear segment of said selected finger is spaced from said linearly disposed scan path, said linearly disposed scan path being a scan path for means to detect distinguishing skin characteristics along said linear segment, whereby said linear segment is not in contact with said detecting means.

* * * * *